2,747,987

PROCESS FOR SEPARATING IRON VALUES FROM TITANIFEROUS IRON MATERIAL

John M. Daubenspeck, Westfield, and Robert S. McNeil, Long Branch, N. J., assignors to National Lead Company, New York, N. Y., a corporation of New Jersey No Drawing. Application February 27, 1952, Serial No. 273,768

3 Claims. (Cl. 75—30)

The present invention relates, in general, to the beneficiation of titaniferous iron materials. More especially, the present invention relates to a superior method for selectively chlorinating the iron values of a titaniferous iron material to produce a concentrate rich in titanium values and substantially free of iron.

Many methods have been utilized to produce titanium dioxide concentrates and/or titanium tetrachloride from titaniferous iron materials by chlorinating the material to selectively separate the iron values from the titanium values. However, most such methods have been plagued by the formation of ferrous chloride which, at the temperatures used, becomes a sticky paste-like condensate which clogs up the reaction bed, conduits, valves and other elements of the chlorination apparatus thereby terminating the reaction prematurely or rendering it so inefficient as to be commercially impracticable.

An object of the present invention is to provide an improved method for separating the iron values from a titaniferous iron material by chlorinating the material in a simple, economical operation adapted to the production of a titanium concentrate of a commercial scale.

A further object of the present invention is to provide a titaniferous concentrate by chlorinating a titaniferous iron material in a manner such that substantially no ferrous chloride is formed and substantially all of the iron values are removed as volatile ferric chloride.

A still further object of the invention is to provide a superior method for producing titaniferous concentrates which are substantially free of iron values.

These and other objects will become apparent from the following more complete description of the invention.

In its broadest aspects the invention contemplates a process for selectively chlorinating a titaniferous iron material by providing sufficient reduced titanium values in the material to accept substantially all of the oxygen of the iron values therein and then chlorinating the material to selectively separate the iron values therefrom as ferric chloride only, the titanium values being substantially unaffected by the chlorine and remaining in the residue as titanim dioxide.

The term "reduced titanium values" as used herein, is synonymous with low valent titanium values and is definitive of oxidic titanium compounds and complex compositions in which the titanium values are present in the material in the trivalent or divalent state.

By way of example, one method for carrying out the process of the present invention is to provide reduced titanium values in a titaniferous iron material by smelting the material at a temperature in excess at 1500° C. at which temperature a fair primary separation of the iron values as molten iron metal from the slag is affected. Pursuant to the instant invention, the reaction is prolonged, until there is sufficient low valent titanium values in the reduced slag to accept substantially all of the oxygen of the residual iron oxide. Particularly satisfactory results have been achieved, for example, when using ilmenite ore, by prolonging the reduction step until from about 5% to about 20% of the slag comprises reduced titanium values, such as, for example, trivalent titanium.

The high titanium slag, sometimes referred to as a reduced slag, which has thus been provided with reduced titanium values, is then chlorinated to selectively separate any remaining iron values in the slag from the titanium values. A preferred method for chlorinating the reduced slag is to pulverize the slag to particle sizes which fall within the size range of from —40 to +200 mesh and then pass chlorine gas through the subdivided material by a static bed or fluosolids operation. With the passage of chlorine through the reduced slag at a temperature sufficient to insure stable compositions as, for example, from about 550° C. to about 950° C., the chlorine reacts with the iron oxide in the slag to produce volatile ferric chloride only, the reduced titanium values serving as acceptors of substantially all of the oxygen of the iron oxide. Upon completion of the reaction, the titanium values are present in the residue in the form of titanium dioxide while substantially all of the iron values have been removed therefrom as volatile ferric chloride. In this regard, it is noteworthy that heretofore most methods of chlorinating titaniferous iron materials have utilized a carbonaceous reducing agent and that as a result considerable amounts of ferrous chloride condensate have been formed; but that by utilizing chlorine alone in conjunction with low valent titanium values in an amount sufficient to accept all of the oxygen of the iron values no carbonaceous reducing agent is necessary and hence no ferrous chloride is formed. The slag bed is thus free of occlusions of ferrous chloride condensate and hence unusually high rates of production and efficiencies are obtained. Moreover, the residue, being rich in titanium values and having little or no iron values, is especially adapted to further treatments for the production of titanium metal, titanium tetrachloride and titanium dioxide for use as pigment material.

By way of illustrating the above described method of the present invention, an ore comprising about 35% titanium dioxide, about 41% iron (total), the remainder being gangue, was smelted at a temperature in excess of substantially 1550° C. to convert a major portion of the iron values to molten iron metal. Any remaining iron in the slag was in the form of iron oxide and traces of iron metal beads. The smelting operation was prolonged to produce in the slag reduced titanium values at least equal to and preferably in excess of the amount of oxygen in the iron oxide. In particular, the reduced titaniferous slag produced from a titaniferous iron ore of the above specified composition comprised substantially 52% titanium dioxide, about 15% reduced titanium values and about 10% iron oxide, the rest being gangue.

6000 parts of this reduced slag, suitably ground to have a particle size in the range of from —35 to +200 mesh, was chlorinated at a temperature of approximately 950° C. by passing chlorine through the comminuted material at the rate of substantially 10 parts per minute. During a run of substantially 3 hours substantially all of the iron oxide was converted to volatile ferric chloride only, the residue comprising titanium dioxide and gangue.

While the invention is described above in terms of the treatment of a titaniferous iron ore to produce a slag having reduced titanium values in an amount sufficient to accept substantially all of the oxygen of the iron values in the slag, it will be understood that the invention comprehends broadly the chlorination in the presence of reduced titanium values of titaniferous iron materials including untreated ores and ore concentrates.

In this connection the invention may be carried out by selecting a titaniferous iron material and admixing with that material sufficient reduced titanium values, as for example, either divalent and trivalent titanium, to accept all the oxygen of the iron values present in the titaniferous material, and then chlorinating the admixture in the absence of a carbonaceous reducing agent and at a temperature such that the chlorine will react with the iron values to form volatile ferric chloride leaving a residue which is rich in titanium dioxide. By way of example, 100 parts of a titaniferous iron material having substantially 45 parts of titanium dioxide and 39 parts reduced iron oxide, the remainder being gangue, was admixed with a highly reduced slag containing 78 parts of a low valent titanium composition, such as $Ti_2O_3$, the 78 parts of the latter composition being sufficient to accept substantially all of the oxygen of the iron oxide in the titaniferous iron material. 57.6 parts of chlorine are reacted with the admixture at a temperature of substantially 800° C. and for one hour at the end of which time substantially all of the iron oxide was separated from the residue as volatile ferric chloride the residue comprising essentially only titanium dioxide and gangue.

By the improved process of this invention, the separation of the iron values from titaniferous iron materials such as ore, ore concentrates and slag may be now carried out on a commercially practicable basis to produce titanium dioxide concentrates free of iron values, the beneficiation of the ore, ore concentrate or slag being affected by chlorine alone in the presence of low valent titanium values and in the absence of a carbonaceous reducing agent whereby substantially no ferrous chloride is formed, and substantially all of the iron values are converted to volatile ferric chloride.

This invention has been described and illustrated by the examples shown and is not intended to be strictly limited thereto and other modifications and variations may be employed within the limits of the following claims.

We claim:

1. A method for separating iron from a titaniferous oxidic iron material by selective chlorination which comprises smelting said material by heating said material to a temperature of at least about 1500° C. to provide in said titaniferous iron material reduced titanium values in an amount sufficient to accept substantially all of the oxygen of the iron values in said material and reacting said material with chlorine to convert substantially all of the iron values to volatile ferric chloride and separating the latter from the residual titanium values.

2. A method for separating iron from a titaniferous oxidic iron material by selective chlorination which comprises heating said material to a temperature sufficient to smelt said titaniferous iron material and form a slag comprising titanium dioxide, iron oxide and reduced titanium values, the reduced titanium values being present in an amount sufficient to accept substantially all of the oxygen of the iron oxide in said slag, chlorinating the slag at a substantially constant temperature sufficiently high to convert substantially all of the iron values to volatile ferric chloride and separating the latter from the residual titanium values.

3. A method for separating iron from a titaniferous oxidic iron material by selective chlorination which comprises providing a titaniferous iron material and admixing therewith reduced titanium values in an amount sufficient to accept substantially all of the oxygen of the iron values in the titaniferous iron material, chlorinating the admixture in the absence of a carbonaceous reducing agent to convert substantially all of the iron values to volatile ferric chloride and separating the latter from the residual titanium values.

References Cited in the file of this patent

UNITED STATES PATENTS

| | | |
|---|---|---|
| 921,686 | Fitzgerald et al. | May 18, 1909 |
| 1,528,319 | Carteret et al. | Mar. 3, 1925 |
| 1,845,342 | Saklatwalla | Feb. 16, 1932 |
| 2,476,453 | Peirce et al. | July 19, 1949 |